(12) United States Patent
Watanabe et al.

(10) Patent No.: US 11,002,239 B2
(45) Date of Patent: May 11, 2021

(54) CONTROL DEVICE

(71) Applicant: SUBARU CORPORATION, Tokyo (JP)

(72) Inventors: Ken Watanabe, Tokyo (JP); Fumiyuki Moriya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/717,653

(22) Filed: Dec. 17, 2019

(65) Prior Publication Data

US 2020/0309079 A1    Oct. 1, 2020

(30) Foreign Application Priority Data

Mar. 26, 2019    (JP) ............................. JP2019-057759

(51) Int. Cl.
| | |
|---|---|
| *F02N 11/08* | (2006.01) |
| *B60W 20/40* | (2016.01) |
| *H02K 47/14* | (2006.01) |
| *H02P 1/18* | (2006.01) |

(52) U.S. Cl.
CPC ........... *F02N 11/087* (2013.01); *B60W 20/40* (2013.01); *H02K 47/14* (2013.01); *H02P 1/18* (2013.01); *F02N 2011/0874* (2013.01)

(58) Field of Classification Search
CPC .. F02N 11/087; F02N 2011/0874; H02P 1/18; B60W 20/40; H02K 47/14
See application file for complete search history.

(56) References Cited

U.S. PATENT DOCUMENTS

| 6,018,198 A * | 1/2000 | Tsuzuki | F16D 48/08 |
| | | | 290/17 |
| 10,065,626 B2 * | 9/2018 | Wang | B60W 20/40 |
| 2005/0099009 A1 * | 5/2005 | Spellman | F02N 15/06 |
| | | | 290/38 R |
| 2008/0276892 A1 * | 11/2008 | Doljack | H02J 7/345 |
| | | | 123/179.28 |

(Continued)

FOREIGN PATENT DOCUMENTS

WO    WO 2013/042717 A1    3/2013

*Primary Examiner* — Joseph J Dallo
(74) *Attorney, Agent, or Firm* — McGinn I.P. Law Group, PLLC.

(57) ABSTRACT

A control device includes an engine, a starter motor configured to perform engine start, a direct-current-to-direct-current converter, a battery coupled to the starter motor with the direct-current-to-direct-current interposed therebetween, and a controller. The controller is configured to execute control of switching between first and second traveling modes. The direct-current-to-direct-current converter is configured to supply an electric power of the battery to the starter motor, and to lower an output voltage to be supplied thereto. The controller is configured to execute output limit control of lowering the output voltage to lower the output current, in a case where an output current of the direct-current-to-direct-current converter becomes equal to or higher than a threshold. The controller is configured to initiate boost permitting control when initiating the engine start in association with switching from the second to first traveling mode. The boost permitting control makes the threshold higher than a usual threshold.

16 Claims, 5 Drawing Sheets

(56) References Cited

U.S. PATENT DOCUMENTS

| | | | |
|---|---|---|---|
| 2013/0257062 A1* | 10/2013 | Sakakibara | F02N 11/0814 |
| | | | 290/38 R |
| 2017/0334422 A1* | 11/2017 | Namuduri | B60W 10/08 |
| 2018/0050685 A1* | 2/2018 | Atluri | B60W 10/06 |
| 2018/0050686 A1* | 2/2018 | Atluri | F02N 11/04 |
| 2020/0072177 A1* | 3/2020 | Clarke | F02N 11/0862 |

* cited by examiner

CONTROL DEVICE

CROSS-REFERENCE TO RELATED APPLICATIONS

The present application claims priority from Japanese Patent Application No. 2019-057759 filed on Mar. 26, 2019, the entire contents of which are hereby incorporated by reference.

BACKGROUND

The technology relates to a control device.

A vehicle that includes an engine and a starter motor that starts the engine is in widespread use. In such a vehicle, cranking of the engine by the starter motor causes the engine to start, as disclosed in International Patent Publication No. 2013/042717, for example.

SUMMARY

An aspect of the technology provides a control device that includes an engine, a starter motor, a direct-current-to-direct-current converter, a battery, and a controller. The starter motor is configured to perform engine start. The engine start is starting of the engine. The battery is coupled to the starter motor with the direct-current-to-direct-current interposed therebetween. The controller is configured to execute control of switching between a first traveling mode in which traveling is performed with the engine being driven and a second traveling mode in which the traveling is performed with the engine being stopped. The direct-current-to-direct-current converter is configured to supply an electric power of the battery to the starter motor, and is configured to lower an output voltage to be supplied to the starter motor. The controller is configured to execute output limit control in a case where an output current of the direct-current-to-direct-current converter becomes equal to or higher than a threshold. The output limit control lowers the output voltage of the direct-current-to-direct-current converter to lower the output current. The controller is configured to initiate boost permitting control when initiating the engine start performed by the starter motor in association with switching from the second traveling mode to the first traveling mode. The boost permitting control makes the threshold higher than a threshold held at a usual time.

An aspect of the technology provides a control device that includes an engine, a starter motor, a direct-current-to-direct-current converter, a battery, and circuitry. The starter motor is configured to perform engine start. The engine start is starting of the engine. The battery is coupled to the starter motor with the direct-current-to-direct-current interposed therebetween. The circuitry is configured to execute control of switching between a first traveling mode in which traveling is performed with the engine being driven and a second traveling mode in which the traveling is performed with the engine being stopped. The direct-current-to-direct-current converter is configured to supply an electric power of the battery to the starter motor, and is configured to lower an output voltage to be supplied to the starter motor. The circuitry is configured to execute output limit control in a case where an output current of the direct-current-to-direct-current converter becomes equal to or higher than a threshold. The output limit control lowers the output voltage of the direct-current-to-direct-current converter to lower the output current. The circuitry is configured to initiate boost permitting control when initiating the engine start performed by the starter motor in association with switching from the second traveling mode to the first traveling mode. The boost permitting control makes the threshold higher than a threshold held at a usual time.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Hereinafter, some example embodiments of the technology will be described in detail with reference to the appended drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. In the present specification and the drawings, components having substantially identical functional configurations are given identical reference characters, and duplicate descriptions thereof will be omitted.

Among vehicles that include a starter motor that starts an engine, there may be a vehicle that further includes a battery coupled to the starter motor with a direct-current-to-direct-current (DC-DC) converter interposed therebetween. In such a vehicle, an electric power of the battery may be stepped down with the DC-DC converter, and the stepped-down electric power may be supplied to the starter motor. When the starter motor cranks the engine in such a vehicle, the power consumption may temporarily increase. In a vehicle in which an output of a DC-DC converter is supplied also to another accessory, the output of the DC-DC converter may fall short due to high power consumption of the accessory at the time when the engine starts, which may influence the engine start performance.

It is desirable to provide a control device that is able to perform an engine start more reliably.

1. CONFIGURATION OF VEHICLE

Figure 1:
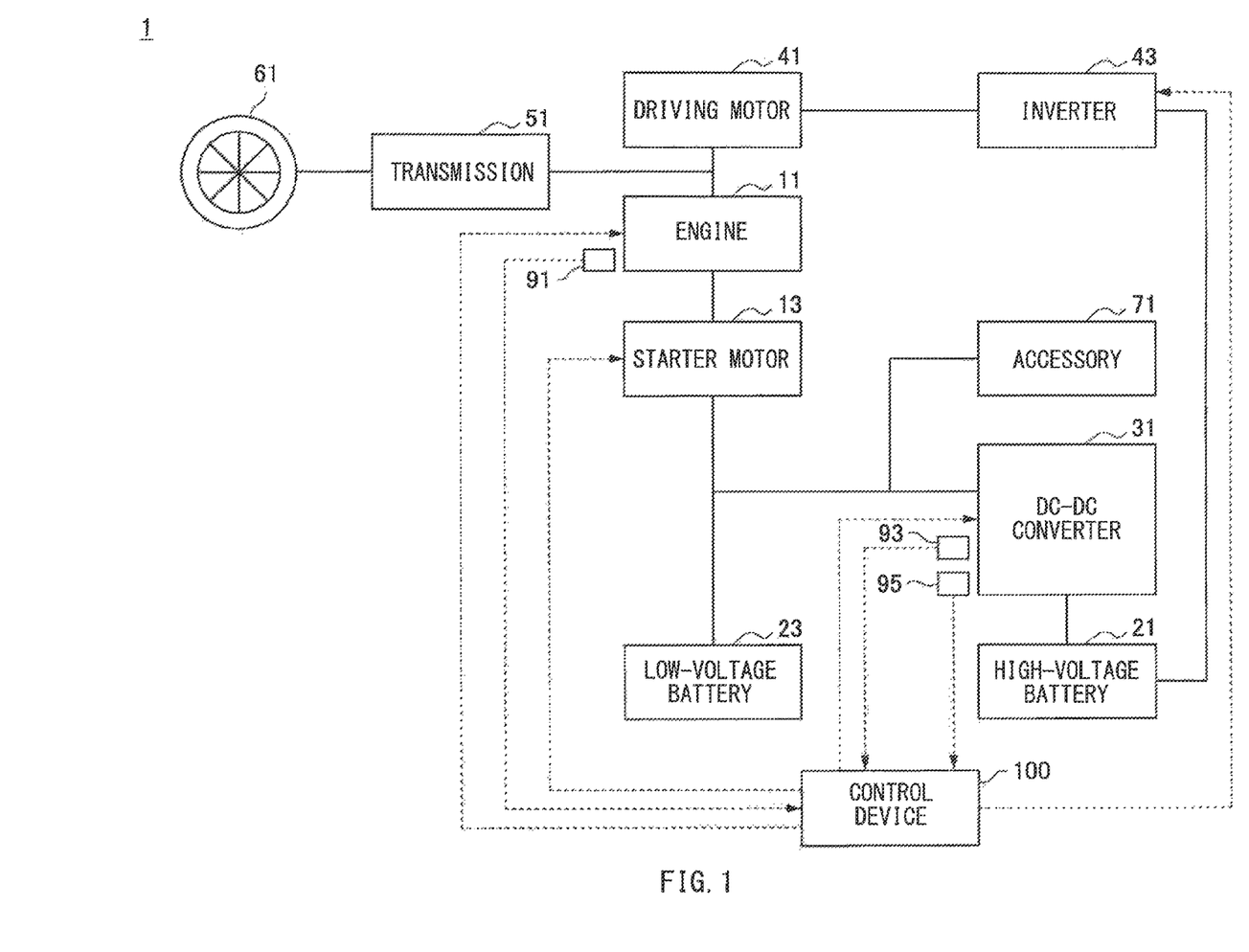
FIG. 1 is a schematic diagram illustrating an example of an outline configuration of a vehicle to which a control device according to one example embodiment of the technology is applicable.
Figure 2:
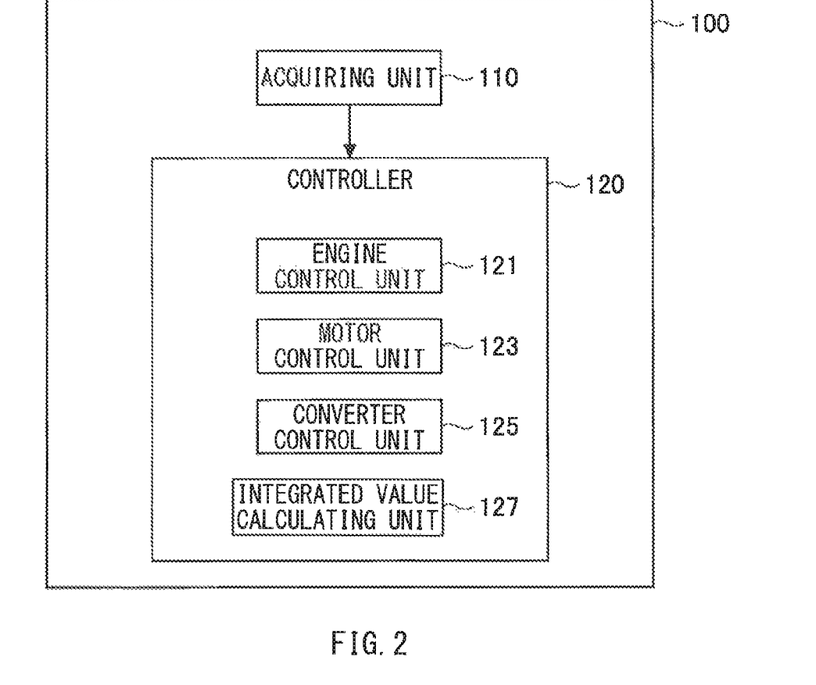
FIG. 2 is a block diagram illustrating an example of an outline configuration of the control device according to one example embodiment.

First, with reference to FIGS. 1 and 2, an outline configuration of a vehicle 1 to which a control device 100 according to one example embodiment of the technology is applicable will be described. FIG. 1 is a schematic diagram illustrating an example of the outline configuration of the vehicle 1 to which the control device 100 is applicable. FIG. 2 is a block diagram illustrating an example of an outline configuration of the control device 100.

The vehicle 1 described below is merely an example of a vehicle to which a control device according to an example embodiment of the technology is applicable. As will be described later, a configuration of the vehicle to which the control device according to an example embodiment of the technology is applicable is not particularly limited to the configuration of the vehicle 1.

As illustrated in FIG. 1, the vehicle 1 may include an engine 11, a starter motor 13, a high-voltage battery 21, a DC-DC converter 31, and the control device 100. The vehicle 1 may further include a low-voltage battery 23, a driving motor 41, an inverter 43, a transmission 51, a driving wheel 61, an accessory 71, an engine rotation speed sensor 91, an output sensor 93, and a temperature sensor 95. In one embodiment, the engine 11 may serve as an "engine." In one embodiment, the starter motor 13 may serve as a "starter motor." In one embodiment, the DC-DC converter 31 may serve as a "DC-DC converter." In one embodiment, the high-voltage battery 21 may serve as a "battery." In one embodiment, the control device 100 may serve as a "controller." The vehicle 1 may be a hybrid electric vehicle that is configured to run on a motive power of the engine 11 and a motive power of the driving motor 41.

The engine 11 may be an internal combustion engine that is fueled by, for example but not limited to, gasoline to generate a motive power. The engine 11 may be configured to output a motive power directed to driving of the driving wheel 61 of the vehicle 1. A crankshaft may serve as an output shaft of the engine 11, and the crankshaft may be coupled to the transmission 51 with, for example but not limited to, an unillustrated torque converter or an unillustrated clutch interposed therebetween. For the transmission 51, a transmission including a continuously-variable transmission (CVT) mechanism may be used, for example. The motive power outputted from the engine 11 may undergo gear shifting in the transmission 51 and be transmitted to the driving wheel 61.

The starter motor 13 starts the engine 11. An output shaft of the starter motor 13 may be coupled to the crankshaft of the engine 11 with a gear interposed therebetween. Transmitting of a motive power outputted from the starter motor 13 to the crankshaft of the engine 11 may cause the cranking of the engine 11, which may start the engine 11. The starter motor 13 may be coupled to the low-voltage battery 23 and the DC-DC converter 31. The starter motor 13 may generate a motive power with the use of an electric power supplied from the low-voltage battery 23 or an electric power supplied from the high-voltage battery 21 via the DC-DC converter 31.

For the starter motor 13, a direct-current motor or an alternating-current motor may be used, for example. In a case where an alternating-current motor is used for the starter motor 13, the starter motor 13 may be coupled to the low-voltage battery 23 and the DC-DC converter 31 with an unillustrated inverter interposed therebetween. In this case, a direct-current electric power supplied from the low-voltage battery 23 or a direct-current electric power supplied from the high-voltage battery 21 via the DC-DC converter 31 may be converted to an alternating-current electric power by the inverter, and the converted alternating-current electric power may be supplied to the starter motor 13.

The starter motor 13 may be configured to generate an electric power with the use of a motive power output from the engine 11. The electric power generated by the starter motor 13 may be supplied to the low-voltage battery 23. Thereby, the low-voltage battery 23 may be charged by the electric power generated by the starter motor 13.

The high-voltage battery 21 may store an electric power to be supplied to the driving motor 41. In a specific but non-limiting example, the high-voltage battery 21 may have a higher voltage than that of the low-voltage battery 23. For example, the high-voltage battery 21 may have a voltage of 100 V. For the high-voltage battery 21, a secondary battery, such as a lithium-ion battery or a nickel-hydrogen battery, may be used, for example.

In a specific but non-limiting example, the high-voltage battery 21 may be coupled to some devices of the vehicle 1 with the DC-DC converter 31 interposed therebetween. In a more specific but non-limiting example, the high-voltage battery 21 may be coupled to the starter motor 13, the low-voltage battery 23, and the accessory 71 of the vehicle 1 with the DC-DC converter 31 interposed therebetween. The high-voltage battery 21 may be configured to step down, with the DC-DC converter 31, the electric power stored therein and supply the stepped-down electric power to the aforementioned devices. The accessory 71 may include various devices, such as an air conditioner, for example. The high-voltage battery 21 may be coupled to the inverter 43. The high-voltage battery 21 may be configured to supply the electric power stored therein to the inverter 43.

The DC-DC converter 31 may be configured to step down an electric power from the high-voltage battery 21 and supply the stepped-down electric power to some devices of the vehicle 1. In a more specific but non-limiting example, the DC-DC converter 31 may be configured to step down an electric power from the high-voltage battery 21 and supply the stepped-down electric power to the starter motor 13, the low-voltage battery 23, and the accessory 71 of the vehicle 1. The DC-DC converter 31 may include a chopper circuit, for example. A switching element may be provided in the DC-DC converter 31, and the electric power from the high-voltage battery 21 may be stepped down as an operation of the switching element is controlled.

The driving motor 41 may be configured to output a motive power directed to driving of the driving wheel 61 of the vehicle 1. An output shaft of the driving motor 41 may be coupled to the transmission 51 with, for example but not limited to, an unillustrated clutch interposed therebetween. The motive power outputted from the driving motor 41 may undergo gear shifting in the transmission 51 and be transmitted to the driving wheel 61.

For the driving motor 41, a polyphase motor, e.g., a three-phase motor, may be used, for example. The driving motor 41 may be coupled to the high-voltage battery 21 with the inverter 43 interposed therebetween. The driving motor 41 may generate a motive power with the use of an electric power supplied from the high-voltage battery 21 via the inverter 43. At this point, a direct-current electric power discharged from the high-voltage battery 21 may be converted to an alternating-current electric power by the inverter 43, and the converted alternating-current electric power may be supplied to the driving motor 41. The driving motor 41 may further serve as a generator that generates an electric power with the use of rotary energy of the driving wheel 61 when the speed of the vehicle 1 is reduced. In other words, the driving motor 41 may also perform regeneration. At this point, an alternating-current electric power generated by the driving motor 41 may be converted to a direct-current electric power by the inverter 43, and the converted direct-current electric power may be supplied to the high-voltage battery 21. Thereby, the high-voltage battery 21 may be charged by the electric power generated by the driving motor 41.

The low-voltage battery 23 may store an electric power to be supplied to the starter motor 13 and the accessory 71. In a specific but non-limiting example, the low-voltage battery 23 may have a lower voltage than that of the high-voltage battery 21. For example, the low-voltage battery 23 may have a voltage of 12 V. For the low-voltage battery 23, a secondary battery, such as a lead-acid battery or a lithium-ion battery, may be used, for example.

In a specific but non-limiting example, the low-voltage battery 23 may be coupled to some devices of the vehicle 1. In a more specific but non-limiting example, the low-voltage battery 23 may be coupled to the starter motor 13 and the accessory 71 of the vehicle 1. The low-voltage battery 23 may be thereby configured to supply the electric power stored therein to the aforementioned devices.

The engine rotation speed sensor 91 may detect a speed of the engine 11 and output a detection result to the control device 100.

The output sensor 93 may detect an output of the DC-DC converter 31 and output a detection result to the control device 100. For example, the output sensor 93 may detect an output electric power and an output current of the DC-DC converter 31.

The temperature sensor 95 may detect a temperature of the DC-DC converter 31 and output a detection result to the control device 100. For example, the temperature sensor 95 may detect a temperature of the switching element in the DC-DC converter 31. The temperature to be detected by the temperature sensor 95 is not particularly limited to the above example and may instead be a temperature of a housing of the DC-DC converter 31, for example.

The control device 100 may include, for example: a central processing unit (CPU), which is an arithmetic processing device; a read only memory (ROM), which is a storage device that holds, for example but not limited to, a program and an arithmetic parameter to be used by the CPU; and a random access memory (RAM), which is a storage device that temporarily holds, for example but not limited to, a parameter that varies as appropriate when the CPU executes an operation.

The control device 100 may communicate with each device provided in the vehicle 1. In a specific but non-limiting example, the control device 100 may communicate with the engine 11, the engine rotation speed sensor 91, the starter motor 13, the DC-DC converter 31, the output sensor 93, the temperature sensor 95, and the inverter 43. The control device 100 may communicate with each device through a controller area network (CAN) communication, for example.

Operations of the control device 100 according to the example embodiment may be implemented by a plurality of control devices, or a plurality of operations may be implemented by a single control device, for example. For example, the controlling of the operation of the engine 11 by the control device 100, the controlling of the operation of the driving motor 41 by the control device 100, and the any other operation may be divided and assigned to separate control devices. In a case where the operations of the control device 100 are implemented by a plurality of control devices, the control devices may be coupled to each other via a communication bus, such as the CAN.

As illustrated in FIG. 2, the control device 100 may include an acquiring unit 110 and a controller 120.

The acquiring unit 110 may acquire various pieces of information to be used in a process performed by the controller 120. The acquiring unit 110 may output acquired information to the controller 120. For example, the acquiring unit 110 may communicate with the engine rotation speed sensor 91, the output sensor 93, and the temperature sensor 95 to acquire various pieces of information outputted from these sensors.

The controller 120 may control an operation of each device of the vehicle 1. The controller 120 may include an engine control unit 121, a motor control unit 123, a converter control unit 125, and an integrated value calculating unit 127.

The engine control unit 121 may control an operation of the engine 11. In a specific but non-limiting example, the engine control unit 121 may control the operation of the engine 11 to control, for example but not limited to, a throttle position, ignition timing, and a fuel injection amount. The engine control unit 121 may thereby control an output of the engine 11.

The engine control unit 121 may also control an operation of the starter motor 13. In a specific but non-limiting example, the engine control unit 121 may control the start of the engine 11 performed by the starter motor 13 by controlling an electric power supply between the low-voltage battery 23 and the starter motor 13. Furthermore, cooperating with the converter control unit 125 described later, the engine control unit 121 may drive the starter motor 13 with the use of an electric power supplied from the high-voltage battery 21 via the DC-DC converter 31 as well.

The motor control unit 123 may control an operation of the driving motor 41. In a specific but non-limiting example, the motor control unit 123 may control an operation of a switching element in the inverter 43 to control an electric power supply between the high-voltage battery 21 and the driving motor 41. The motor control unit 123 may thereby control generation of a motive power and generation of an electric power by the driving motor 41.

The controller 120 may control the operation of the engine 11 and the operation of the driving motor 41 as described above and thereby execute switching of a traveling mode of the vehicle 1 between a hybrid electric vehicle (HEV) traveling mode in which the vehicle 1 travels with the engine 11 being driven and an electric vehicle (EV) traveling mode in which the vehicle 1 travels with the engine 11 being stopped. In a specific but non-limiting example, in the HEV traveling mode, the vehicle 1 may travel with the use of a motive power of the engine 11 and a motive power of the driving motor 41. In the EV traveling mode, the vehicle 1 may travel with the use of a motive power of the driving motor 41 with the engine 11 being stopped. In one embodiment, the HEV traveling mode may serve as a "first traveling mode." In one embodiment, the EV traveling mode may serve as a "second traveling mode."

For example, the controller 120 may switch the traveling mode of the vehicle 1 on the basis of a requested driving power. The requested driving power may be a requested value of a motive power to be transmitted to the driving wheel 61. In a specific but non-limiting example, the controller 120 may switch the traveling mode of the vehicle 1 to the HEV traveling mode in a case where the requested driving power is higher than a reference driving power. In contrast, the controller 120 may switch the traveling mode of the vehicle 1 to the EV traveling mode in a case where the reference driving power is equal to or lower than the reference driving power. The reference driving power may be set to a value smaller than a maximum value of a motive power that the driving motor 41 is able to transmit to the driving wheel 61. For example, the reference driving power may be set in accordance with, for example but not limited to, the specifications of the driving motor 41, from the viewpoint of improving the electric power consumption. The controller 120 may be configured to calculate the requested driving power on the basis of an accelerator position and a vehicle speed, for example.

The converter control unit 125 may control an operation of the DC-DC converter 31. In a specific but non-limiting example, the converter control unit 125 may control an operation of the switching element in the DC-DC converter 31 to control an electric power supply between the high-voltage battery 21 and the starter motor 13, the low-voltage battery 23, and the accessory 71.

The converter control unit 125 may be configured to execute output limit control of, in a case where an output current of the DC-DC converter 31 is equal to or higher than a threshold, lowering the output current by lowering an output voltage of the DC-DC converter 31. In a specific but non-limiting example, in a case where the output current of the DC-DC converter 31 is equal to or higher than the threshold, the converter control unit 125 may perform control of lowering the output current by varying a duty ratio of an ON/OFF state of the switching element in the DC-DC converter 31 to lower the output voltage of the DC-DC converter 31. The threshold may be set, for example, to such a value at which heat produced in the DC-DC converter 31 does not cause the DC-DC converter 31 to malfunction even in a case where the DC-DC converter 31 operates in a state in which the output current of the DC-DC converter 31 is at that value. In the following, such a threshold may also be referred to as an output limit threshold.

The integrated value calculating unit 127 may calculate an integrated value of an output of the DC-DC converter 31. For example, the integrated value calculating unit 127 may calculate, as the integrated value of the output of the DC-DC converter 31, a root mean square value of an output current of the DC-DC converter 31. The integrated value calculating unit 127 may determine a reference time, described later, on the basis of the integrated value of the output of the DC-DC converter 31.

In the control device 100 according to the example embodiment, the controller 120 initiates boost permitting control when initiating the engine start performed by the starter motor 13 in association with switching of the traveling mode from the EV traveling mode to the HEV traveling mode. The boost permitting control makes the output limit threshold greater than an output limit threshold held at a usual time. This makes it possible to perform the engine start more reliably. Details of such control performed by the controller 120 will be described later.

2. OPERATION OF CONTROL DEVICE

Now, with reference to FIGS. 3 to 6, an operation of the control device 100 according to the example embodiment will be described. In the following, a first example and a second example will be described in this order as examples of a flow of a process performed by the control device 100.

2-1. First Example

First, with reference to FIGS. 3 and 4, the first example of the flow of the process performed by the control device 100 will be described.

Figure 3:
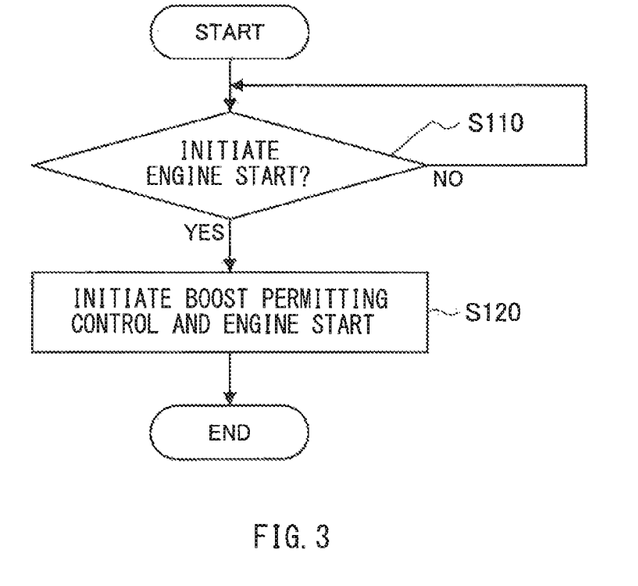
FIG. 3 is a flowchart illustrating a first example of a flow of a process performed by the control device according to one example embodiment.

FIG. 3 is a flowchart illustrating the first example of the flow of the process performed by the control device 100. In a specific but non-limiting example, a control flow according to the first example illustrated in FIG. 3 may be a flow of a process related to control to be performed when an engine start request, i.e., a request to start the engine 11, is made by the controller 120 of the control device 100 and may be initiated in a case where the traveling mode of the vehicle 1 is the EV traveling mode. In other words, at a point when the control flow according to the first example illustrated in FIG. 3 is initiated, the traveling mode of the vehicle 1 may be the EV traveling mode.

When the control flow according to the first example illustrated in FIG. 3 is initiated, first, in step S110, the controller 120 may determine whether to initiate the engine start. In a case where it is determined to initiate the engine start (YES in step S110), the flow may proceed to step S120. In contrast, in a case where it is determined not to initiate the engine start (NO in step S110), the process in step S110 may be repeated.

In a specific but non-limiting example, the controller 120 may determine to initiate the engine start in association with switching of the traveling mode of the vehicle 1 from the EV traveling mode to the HEV traveling mode. For example, in a case where the requested driving power is higher than the reference driving power, the controller 120 may switch the traveling mode of the vehicle 1 from the EV traveling mode to the HEV traveling mode and determine to initiate the engine start.

In a case where the determination is YES in step S110, in step S120, the controller 120 may initiate the boost permitting control and the engine start.

When the engine start is initiated, the output of the DC-DC converter 31 may possibly fall short. In a specific but non-limiting example, if the accessory 71 is in operation when the engine start is initiated, the output limit control may be executed because the output current of the DC-DC converter 31 is equal to or higher than the output limit threshold. The output of the DC-DC converter 31 may thereby possibly fall short of the electric power to be consumed by the starter motor 13 and the accessory 71. Accordingly, in the example embodiment, the controller 120 may initiate the boost permitting control of making the output limit threshold greater than an output limit threshold held at a usual time, when initiating the engine start in association with the switching of the traveling mode of the vehicle 1 from the EV traveling mode to the HEV traveling mode. The usual time may refer to a time when no engine start request is being made and the electric power consumed by the accessory 71 is relatively small. Making the output limit threshold greater than the output limit threshold held at the usual time may allow the output of the DC-DC converter 31 to take a greater value than a value held at the usual time. Therefore, it is possible to reduce the possibility that the output of the DC-DC converter 31 falls short of the electric power to be consumed by the starter motor 13 and the accessory 71. Accordingly, it is possible to perform the engine start more reliably.

In the following description, the output limit threshold held in a state in which the boost permitting control is not being executed, i.e., the usual time, may be also referred to as a first threshold, and the output limit threshold held in a state in which the boost permitting control is being executed may be also referred to as a second threshold. The first threshold may be set, for example, to such a value at which heat produced in the DC-DC converter 31 does not cause the DC-DC converter 31 to malfunction even in a case where the DC-DC converter 31 continuously operates in a state in which the output current of the DC-DC converter 31 is at that value. The first threshold may be a rated current of the DC-DC converter 31, for example. The second threshold may be set, for example, to such a value at which heat produced in the DC-DC converter 31 does not cause the DC-DC converter 31 to malfunction even in a case where the DC-DC converter 31 operates for a relatively-short period of time, e.g., a time required for the engine start, in a state in which the output current of the DC-DC converter 31 is at that value.

When the process in step S120 is finished, the control flow illustrated in FIG. 3 is terminated.

Figure 4:
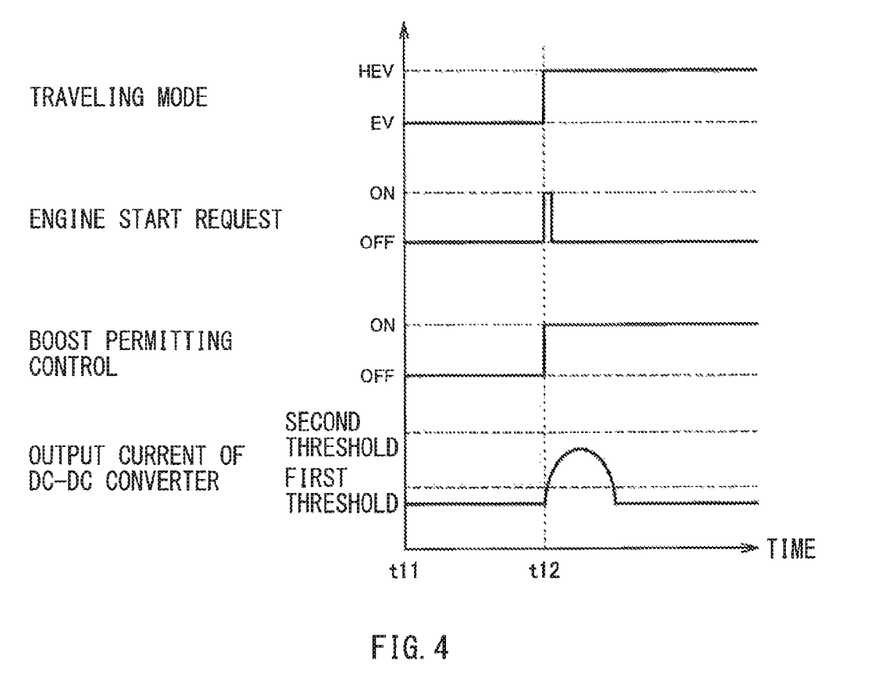
FIG. 4 is a timing chart illustrating an example of a manner in which each quantity of state varies in accordance with the first example of the flow of the process performed by the control device according to one example embodiment.

FIG. 4 is a timing chart illustrating an example of a manner in which each quantity of state varies in accordance with the first example of the flow of the process performed by the control device 100. FIG. 4 illustrates variation in each of the traveling mode, the engine start request, the boost permitting control state, and the output current of the DC-DC converter 31. In this example, the traveling mode may indicate whether the traveling mode of the vehicle 1 is the HEV traveling mode ("HEV") or the EV traveling mode ("EV"). The engine start request may indicate whether the request is made ("ON") or the request is not made ("OFF"). The boost permitting control state may indicate whether the controller 120 is executing the boost permitting control ("ON") or is not executing the boost permitting control ("OFF"). At a time t11, the process according to the first example performed by the control device 100 may have been started already.

At the time t11, the traveling mode of the vehicle 1 may be the EV traveling mode, the engine start request may be OFF, the boost permitting control may not be being executed, and the output current of the DC-DC converter 31 may be smaller than the first threshold. Since the boost permitting control is not being executed, the output limit threshold may be set to the first threshold.

After the above-described state, when the traveling mode of the vehicle 1 is switched from the EV traveling mode to the HEV traveling mode at a time t12, the engine start request may vary to ON from OFF for a short period of time, and a state in which the boost permitting control is not being executed may vary to a state in which the boost permitting control is being executed. Initiating the boost permitting control in this manner may cause the output limit threshold to be varied from the first threshold to the second threshold. At this point, initiating the engine start may cause the electric power consumed by the starter motor 13 to be added to the electric power consumed by the accessory 71. The output current of the DC-DC converter 31 may thereby become equal to or higher than the first threshold. In the example illustrated in FIG. 4, the output current of the DC-DC converter 31 held in a case where the electric power consumed by the starter motor 13 is added to the electric power consumed by the accessory 71 may be a value that is equal to or higher than the first threshold but lower than the second threshold. In this example, since the boost permitting control is being executed and the output limit threshold is set to the second threshold, the output limit control may not be executed in the DC-DC converter 31. Therefore, it is possible to reduce the possibility that the output of the DC-DC converter 31 falls short of the electric power to be consumed by the starter motor 13 and the accessory 71. Accordingly, it is possible to perform the engine start more reliably.

2-2. Second Example

Now, with reference to FIGS. 5 and 6, a second example of the flow of the process performed by the control device 100 will be described.

Figure 5:
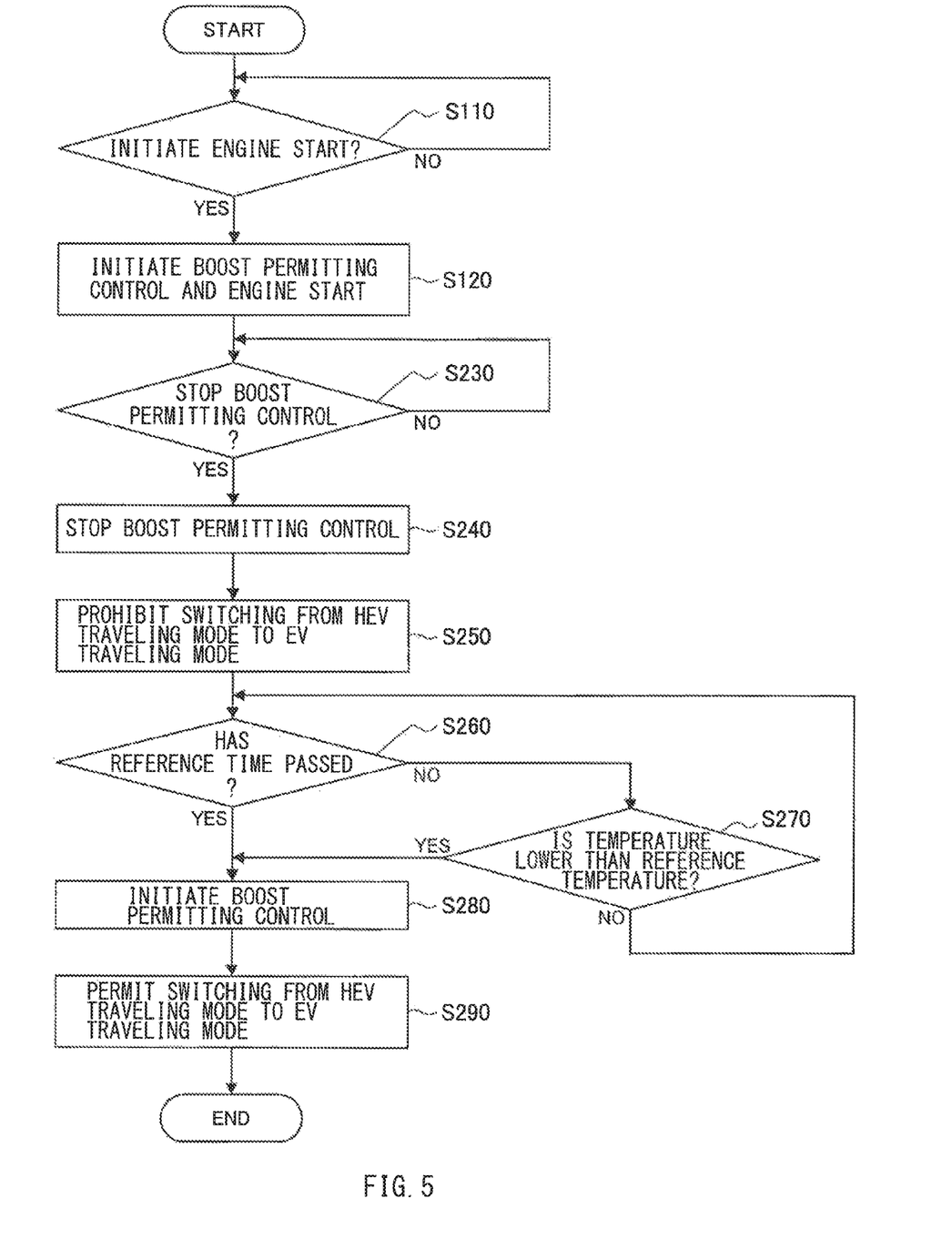
FIG. 5 is a flowchart illustrating a second example of the flow of the process performed by the control device according to one example embodiment.

FIG. 5 is a flowchart illustrating the second example of the flow of the process performed by the control device 100. In a specific but non-limiting example, as with the control flow according to the first example illustrated in FIG. 3, a control flow according to the second example illustrated in FIG. 5 may be a flow of a process related to control to be performed when an engine start request is made by the controller 120 of the control device 100 and may be initiated in a case where the traveling mode of the vehicle 1 is the EV traveling mode. In other words, at a point when the control flow according to the second example illustrated in FIG. 5 is started, the traveling mode of the vehicle 1 may be the EV traveling mode.

The second example may differ from the first example in that, after the engine start is initiated, boost permitting control is initiated once and then stopped, that switching from the HEV traveling mode to the EV traveling mode is prohibited while the boost permitting control is being stopped, and that the boost permitting control is initiated again after the boost permitting control is stopped.

In the control flow according to the second example illustrated in FIG. 5, after the process in step S120, the flow may proceed to step S230, unlike the control flow according to the first example illustrated in FIG. 3.

In step S230, the controller 120 may determine whether to stop the boost permitting control. In a case where it is determined to stop the boost permitting control (YES in step S230), the flow may proceed to step S240. In contrast, in a case where it is determined to continue the boost permitting control (NO in step S230), the process in step S230 may be repeated.

In a specific but non-limiting example, the controller 120 may determine to stop the boost permitting control when the engine rotation speed, which is the rotation speed of the engine 11, reaches a reference rotation speed. The reference rotation speed may be set to a value that may allow for determining whether the running condition of the engine 11 is relatively stabilized. For example, the reference rotation speed may be set in accordance with, for example but not limited to, the specifications of the engine 11 from the viewpoint of starting the engine 11 reliably.

In a case where the determination is YES in step S230, in step S240, the controller 120 may stop the boost permitting control. This may cause the output limit threshold to vary from the second threshold to the first threshold.

In a case where the output current of the DC-DC converter 31 becomes higher than the first threshold in association with initiating of the engine start, the temperature of the DC-DC converter 31 may be in a relatively-high state. If the output current of the DC-DC converter 31 becomes higher than the first threshold again in the above-described state, the possibility may increase that the DC-DC converter 31 malfunctions due to heat produced in the DC-DC converter 31. Therefore, the DC-DC converter 31 may need to be cooled. In the example embodiment, in step S240, the controller 120 may stop the boost permitting control after the initiating of the engine start and set the output limit threshold to the first threshold. This may make it possible to achieve a state in which the output current of the DC-DC converter 31 does not become higher than the first threshold. Accordingly, it is possible to cool the DC-DC converter 31 appropriately after the initiating of the engine start.

Thereafter, in step S250, the controller 120 may prohibit switching of the traveling mode of the vehicle 1 from the HEV traveling mode to the EV traveling mode while the boost permitting control is being stopped after the boost permitting control is executed in association with the initiating of the engine start.

If the traveling mode of the vehicle 1 is switched from the HEV traveling mode to the EV traveling mode while the boost permitting control is being stopped, it may not be possible to perform the engine start when the traveling mode of the vehicle 1 needs to be switched from the EV traveling mode to the HEV traveling mode thereafter, e.g., when the requested driving power is greater than the reference driving power. In a specific but non-limiting example, in a case where the engine start is to be initiated when the boost permitting control is being stopped and the electric power consumed by the accessory 71 is large, the output of the DC-DC converter 31 may fall short, and it may not be possible to perform the engine start. In the example embodiment, in step S250, the controller 120 may prohibit switching of the traveling mode of the vehicle 1 from the HEV traveling mode to the EV traveling mode while the boost permitting control is being stopped after the boost permitting control is executed in association with the initiating of the engine start. Therefore, it is possible to suppress an occurrence of a situation in which the engine start is performed while the boost permitting control is being stopped. Accordingly, it is possible to reduce the possibility that the engine start fails.

Thereafter, in step S260, the controller 120 may determine whether a reference time passes after the boost permitting control is executed in association of the initiating of the engine start and is thereafter stopped. The reference time may be determined on the basis of the integrated value of the output of the DC-DC converter 31 during a period in which the boost permitting control is being executed. In a case where it is determined that the reference time passes (YES in step S260), the flow may proceed to step S280. In contrast, in a case where it is determined that the reference time does not passed (NO in step S260), the flow may proceed to step S270.

In a specific but non-limiting example, the reference time may be such a time that may allow for determining whether the temperature of the DC-DC converter 31 is sufficiently low. The extent in which the temperature of the DC-DC converter 31 rises while the boost permitting control is being executed in association with the initiating of the engine start may be greater as the integrated value of the output of the DC-DC converter 31 during the period in which the boost permitting control is being executed is greater. Therefore, it may be possible to determine the reference time that may allow for determining whether the temperature of the DC-DC converter 31 is sufficiently low, on the basis of the integrated value of the output of the DC-DC converter 31 during the period in which the boost permitting control is being executed. A state in which the temperature of the DC-DC converter 31 is sufficiently low may be, for example, a state in which heat produced in the DC-DC converter 31 does not cause the DC-DC converter 31 to malfunction even in a case where the output current of the DC-DC converter 31 becomes higher than the first threshold in association with the initiating of the engine start in that state.

In a case where the determination is NO in step S260, in step S270, the controller 120 may determine whether the temperature of the DC-DC converter 31 is lower than the reference temperature after the boost permitting control is executed in association with the initiating of the engine start and is thereafter stopped. In a case where it is determined that the temperature of the DC-DC converter 31 is lower than the reference temperature (YES in step S270), the flow may proceed to step S280. In contrast, in a case where the temperature of the DC-DC converter 31 is not lower than the reference temperature (NO in step S270), the flow may return to step S260.

In a specific but non-limiting example, the reference temperature may be such a value that may allow for determining whether the temperature of the DC-DC converter 31 is sufficiently low.

In a case where the determination is YES in step S260 or in step S270, in step S280, the controller 120 may initiate the boost permitting control.

Thereafter, in step S290, the controller 120 may permit switching the traveling mode of the vehicle 1 from the HEV traveling mode to the EV traveling mode.

In this manner, the controller 120 may initiate the boost permitting control when the reference time passes after the boost permitting control is executed in association of the initiating of the engine start and is thereafter stopped. The reference time may be determined on the basis of the integrated value of the output of the DC-DC converter 31 during a period in which the boost permitting control is being executed. Thereby, in a state in which the temperature of the DC-DC converter 31 is sufficiently low, the output limit control may not be executed even in a case where the output current of the DC-DC converter 31 is equal to or higher than the first threshold as a result of an increase in the electric power consumed by the accessory 71. Accordingly, it is possible to suppress an output of the low-voltage battery 23 by supplying a current to the accessory 71 by the DC-DC converter 31. This makes it possible to extend the lifetime of the low-voltage battery 23. Furthermore, the controller 120 may initiate the boost permitting control in a case where the temperature of the DC-DC converter 31 becomes lower than the reference temperature after the boost permitting control is executed in association of the initiating of the engine start and is thereafter stopped. Thereby, in a state in which it is more certain that the temperature of the DC-DC converter 31 has become sufficiently low, the output limit control may not be executed even in a case where the output current of the DC-DC converter 31 is equal to or higher than the first threshold as a result of an increase in the electric power consumed by the accessory 71. Accordingly, it is possible to suppress an output of the low-voltage battery 23 more reliably, and it is therefore possible to extend the lifetime of the low-voltage battery 23 more appropriately. The controller 120 may permit switching of the traveling mode of the vehicle 1 from the HEV traveling mode to the EV traveling mode after the boost permitting control is stopped and is thereafter initiated again. Thereby, it is possible to switch the traveling mode of the vehicle 1 from the HEV traveling mode to the EV traveling mode. Accordingly, it is possible to improve the fuel efficiency of the vehicle 1.

From the viewpoint of performing the engine start more reliably, the controller 120 may keep the boost permitting control being stopped even in a case where the reference time passes after the boost permitting control is executed in association with the initiating of the engine start and is thereafter stopped. Furthermore, the controller 120 may keep the boost permitting control being stopped even in a case where the temperature of the DC-DC converter 31 becomes lower than the reference temperature after the boost permitting control is executed in association with the initiating of the engine start and is thereafter stopped. Thereby, the output limit threshold may be maintained at the first threshold. Therefore, it is possible to reduce the possibility that the output current of the DC-DC converter 31 becomes equal to or higher than the first threshold as a result of an increase in the electric power consumed by the accessory 71 and it becomes impossible to execute the boost permitting control as the temperature of the DC-DC converter 31 fails to decrease to a sufficient level when the engine start is to be initiated. Accordingly, it is possible to perform the engine start more reliably.

After step S290, the control flow illustrated in FIG. 5 may be terminated.

Figure 6:
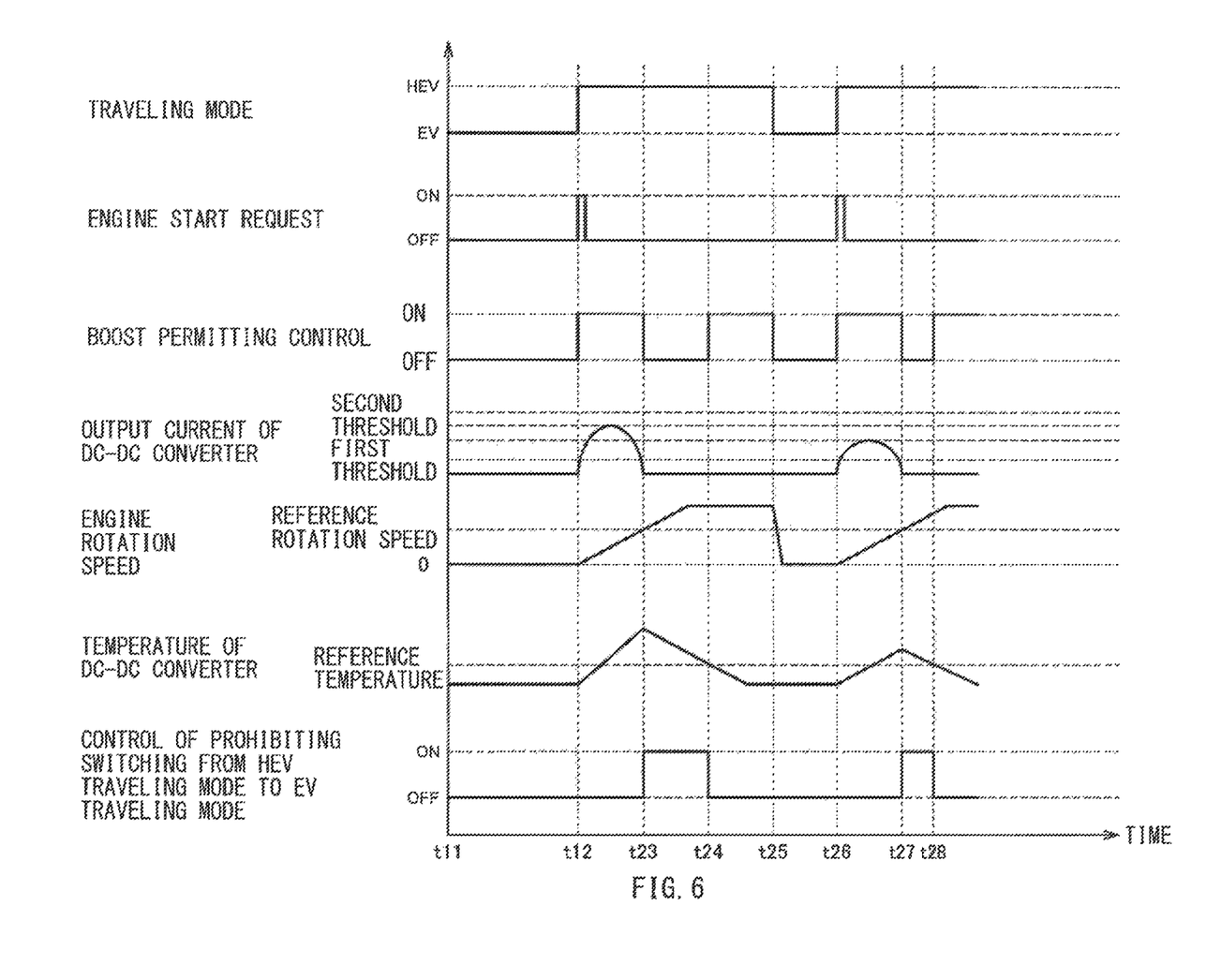
FIG. 6 is a timing chart illustrating an example of a manner in which each quantity of state varies in accordance with the second example of the flow of the process performed by the control device according to one example embodiment.

FIG. 6 is a timing chart illustrating an example of a manner in which each quantity of state varies in accordance with the second example of the flow of the process performed by the control device 100. As with the timing chart according to the first example illustrated in FIG. 4, FIG. 6 illustrates variation in each of the traveling mode, the engine start request, the boost permitting control state, and the output current of the DC-DC converter 31. FIG. 6 further illustrates variation in each of the engine rotation speed, the temperature of the DC-DC converter 31, and switching prohibiting control. In this example, the switching prohibiting control may indicate whether control of prohibiting switching from the HEV traveling mode to the EV traveling mode is being performed ("ON") or is not being performed ("OFF"). At a time t11, the process according to the second example performed by the control device 100 may have been started already.

In the timing chart according to the second example illustrated in FIG. 6, the variation in the traveling mode, the engine start request, and the output of the DC-DC converter 31 that occurs before a time t12 may be similar to that in the timing chart according to the first example illustrated in FIG. 4, and therefore, detailed description thereof will be omitted.

In the timing chart according to the second example illustrated in FIG. 6, at the time t11, the boost permitting control may not be being executed, the engine rotation speed may be zero, the temperature of the DC-DC converter 31 may be lower than the reference temperature, and the switching prohibiting control may be OFF. In the example illustrated in FIG. 6, in a case where the traveling mode of the vehicle 1 is the EV traveling mode, as described above, the boost permitting control may not be being executed from the viewpoint of performing the engine start more reliably. At the time t12, the boost permitting control may be executed, the engine rotation speed may start rising from zero, and the temperature of the DC-DC converter 31 may start rising. Execution of the boost permitting control may cause the output limit threshold to be varied from the first threshold to the second threshold.

When the engine rotation speed reaches the reference rotation speed at a time t23 after the engine start is initiated at the time t12, a state in which the boost permitting control is being executed may vary to a state in which the boost permitting control is not being executed, the output current of the DC-DC converter 31 may become equal to or lower than the first threshold, the temperature of the DC-DC converter 31 may start falling, and the switching prohibiting control may vary to ON from OFF. Stopping of the boost permitting control may cause the output limit threshold to be varied from the second threshold to the first threshold. The temperature of the DC-DC converter 31 may become higher than the reference temperature in a period from the time t12 to the time t23.

In the example illustrated in FIG. 6, the reference time determined on the basis of the integrated value of the output of the DC-DC converter 31 during a period in which the boost permitting control is being executed in association with the initiating of the engine start at the time t12, i.e., the period from the time t12 to the time t23, may be the length of time from the time t23 to a time t24. When the reference time passes at the time t24, the state in which the boost permitting control is not being executed may vary to a state in which the boost permitting control is being executed, and the switching prohibiting control may vary to OFF from ON. In the example of the timing chart illustrated in FIG. 6, the time at which the reference time passes may be identical to the time at which the temperature of the DC-DC converter 31 becomes lower than the reference temperature. Accordingly, the time t24 may be regarded as the time at which the temperature of the DC-DC converter 31 becomes lower than the reference temperature.

When the traveling mode of the vehicle 1 is switched from the HEV traveling mode to the EV traveling mode at a time t25, a state in which the boost permitting control is being executed may vary to a state in which the boost permitting control is not being executed, and the engine rotation speed may start falling. Varying from the state in which the boost permitting control is being executed to the state in which the boost permitting control is not being executed may cause the output limit threshold to be set to the first threshold. Therefore, in a case where the traveling mode of the vehicle 1 is the EV traveling mode, the output current of the DC-DC converter 31 may refrain from becoming higher than the first threshold although no engine start request is being made. Therefore, it is possible to reduce the possibility that, in a case where the engine start is to be initiated, it is not possible to execute the boost permitting control because the temperature of the DC-DC converter 31 is not decreased to a sufficient level. Accordingly, it is possible to perform the engine start more reliably. When it is estimated that there cannot be a possibility that it is not possible to execute the boost permitting control because the temperature of the DC-DC converter 31 is not decreased to a sufficient level when the engine start is to be initiated, the state in which the boost permitting control is being executed may be continued even if the traveling mode of the vehicle 1 is the EV traveling mode.

When the traveling mode of the vehicle 1 is switched from the EV traveling mode to the HEV traveling mode at a time t26, the engine start request may vary to ON from OFF for a short period of time, and a state in which the boost permitting control is not being executed may vary to a state in which the boost permitting control is being executed. Execution of the boost permitting control may cause the output limit threshold to be varied from the first threshold to the second threshold. At this point, initiating of the engine start may cause the electric power consumed by the starter motor 13 to be added to the electric power consumed by the accessory 71, and the output current of the DC-DC converter 31 may become equal to or higher than the first threshold. In the example illustrated in FIG. 6, the output current of the DC-DC converter 31 held in a case where the electric power consumed by the starter motor 13 is added to the electric power consumed by the accessory 71 may be equal to or higher than the first threshold but lower than the second threshold. In this example, since the boost permitting control is being executed and the output limit threshold is set to the second threshold, the output limit control may not be executed in the DC-DC converter 31. Thereafter, in association with the initiating of the engine start, the engine rotation speed may start rising from zero, and the temperature of the DC-DC converter 31 may start rising.

When the engine rotation speed reaches the reference rotation speed at a time t27 after the engine start is initiated at the time t26, a state in which the boost permitting control is being executed may vary to a state in which the boost permitting control is not being executed, the output current of the DC-DC converter 31 may become equal to or lower than the first threshold, the temperature of the DC-DC converter 31 may start falling, and the switching prohibiting control may vary to ON from OFF. Stopping of the boost permitting control may cause the output limit threshold to be changed from the second threshold to the first threshold. The temperature of the DC-DC converter 31 may become higher than the reference temperature in a period from the time t26 to the time t27.

In the example illustrated in FIG. 6, the reference time determined on the basis of the integrated value of the output of the DC-DC converter 31 during a period in which the boost permitting control is being executed in association with the initiating of the engine start at the time t26, i.e., the period from the time t26 to the time t27, may be the length of time from the time t27 to a time t28. When the reference time passes at the time t28, a state in which the boost permitting control is not being executed may vary to a state in which the boost permitting control is being executed, and the switching prohibiting control may vary to OFF from ON.

In the example illustrated in FIG. 6, the duration from the time t12 to the time t23 during which the boost permitting control is performed in association with the first-time initiating of the engine start may be equal to the duration from the time t26 to the time t27 during which the boost permitting control is performed in association with the second-time initiating of the engine start. The output current of the DC-DC converter 31 in the period from the time t26 to the time t27 may be smaller than the output current of the DC-DC converter 31 in the period from the time t12 to the time t23. Therefore, the integrated value of the output of the DC-DC converter 31 in the period from the time t26 to the time t27 may be smaller than the integrated value of the output of the DC-DC converter 31 in the period from the time t12 to the time t23. Accordingly, the reference time determined on the basis of the integrated value of the output of the DC-DC converter 31 in the period from the time t26 to the time t27, i.e., the length of time from the time t27 to the time t28, may be shorter than the reference time determined on the basis of the integrated value of the output of the DC-DC converter 31 in the period from the time t12 to the time t23, i.e., the length of time from the time t23 to the time t24. In this manner, the reference time may be shorter as the integrated value of the output of the DC-DC converter 31 in a period in which the boost permitting control is being executed in association with the initiating of the engine start is smaller, and the reference time may be longer as the integrated value of the output of the DC-DC converter 31 in a period in which the boost permitting control is being executed in association with the initiating of the engine start is greater.

3. EXAMPLE EFFECTS OF CONTROL DEVICE

Now, some example effects of the control device 100 according to the example embodiment will be described.

In the control device 100 according to the example embodiment, the controller 120 may be configured to execute the output limit control of, in a case where an output current of the DC-DC converter 31 becomes equal to or higher than a threshold, lowering the output current by lowering the output voltage of the DC-DC converter 31. Furthermore, the controller 120 may initiate the boost permitting control of making the threshold (the output limit threshold) greater than a threshold held at a usual time, when the starter motor 13 initiates the engine start in association with switching of the traveling mode from the EV traveling mode to the HEV traveling mode. Thereby, it is possible to reduce the possibility that the output of the DC-DC converter 31 falls short when the engine start is initiated. Accordingly, it is possible to perform the engine start more reliably.

In one example embodiment, the controller 120 may initiate the boost permitting control once and then stop the boost permitting control after the engine start is initiated. This makes it possible to achieve a state in which the output current of the DC-DC converter 31 refrains from becoming higher than the first threshold after the engine start is initiated. Accordingly, it is possible to cool the DC-DC converter 31 appropriately after the engine start is initiated.

In one example embodiment, the controller 120 may stop the boost permitting control when the engine rotation speed reaches the reference rotation speed after the engine start is initiated. This makes it possible to achieve a state in which the output current of the DC-DC converter 31 refrains from becoming higher than the first threshold after the running condition of the engine 11 is relatively stabilized. Accordingly, it is possible to cool the DC-DC converter 31 having an increased temperature while performing the engine start more reliably.

In one example embodiment, the controller 120 may initiate the boost permitting control when the reference time passes after the boost permitting control is executed in association with the initiating of the engine start and is thereafter stopped. The reference time may be determined on the basis of the integrated value of the output of the DC-DC converter 31 during a period in which the boost permitting control was being executed. Thereby, in a state in which the temperature of the DC-DC converter 31 is sufficiently low, the output limit control may not be executed even in a case where the output current of the DC-DC converter 31 becomes equal to or higher than the first threshold as a result of an increase in the electric power consumed by the accessory 71. Accordingly, it is possible to suppress an output of the low-voltage battery 23, and it is therefore possible to extend the lifetime of the low-voltage battery 23.

In one example embodiment, the controller 120 may initiate the boost permitting control in a case where the temperature of the DC-DC converter 31 becomes lower than the reference temperature after the boost permitting control is executed in association with the initiating of the engine start and is thereafter stopped. Thereby, in a state in which it is more certain that the temperature of the DC-DC converter 31 is sufficiently low, the output limit control may not be executed even in a case where the output current of the DC-DC converter 31 becomes equal to or higher than the first threshold as a result of an increase in the electric power consumed by the accessory 71. Accordingly, it is possible to suppress an output of the low-voltage battery 23 more reliably, and it is therefore possible to extend the lifetime of the low-voltage battery 23 more appropriately.

In one example embodiment, the controller 120 may prohibit switching from the HEV traveling mode to the EV traveling mode while the boost permitting control is being stopped after the boost permitting control is executed in association with the initiating of the engine start. This makes it possible to suppress an occurrence of a situation in which the engine start is performed while the boost permitting control is being stopped. Accordingly, it is possible to reduce the possibility that the engine start fails.

4. CONCLUSION

Thus far, some example embodiments of the technology have been described in detail with reference to the appended drawings, but the technology is not limited to the above examples. It is apparent that any person having ordinary knowledge in the technical field to which the technology belongs is able to conceive of various modification examples and alternation examples within the technical idea set forth in the appended claims, and it should be appreciated that these modification examples and alternation examples are encompassed by the technical scope of the technology.

For example, the processes described with reference to the flowcharts in the present specification do not necessarily need to be executed in the order indicated in the flowcharts. Some of the processing steps may be executed in parallel. Furthermore, an additional processing step may be employed, or one or more of the processing steps may be omitted.

For example, in the foregoing example embodiments, an example has been described in which the vehicle to which the control device 100 according to an example embodiment of the technology is applicable is a hybrid electric vehicle that is able to travel on a motive power of the engine 11 and a motive power of the driving motor 41. However, the vehicle to which the control device 100 according to an example embodiment of the technology is applicable is not particularly limited to this example. For example, the vehicle to which the control device 100 according to an example embodiment of the technology is applicable may be a vehicle that is able to travel only on a motive power of the engine 11.

For example, in the foregoing example embodiments, an example has been described in which the controller 120 stops the boost permitting control when the engine rotation speed reaches the reference rotation speed after the engine start is initiated. However, the timing at which the controller 120 stops the boost permitting control after the engine start is initiated is not particularly limited to this example. For example, the timing at which the controller 120 stops the boost permitting control after the engine start is initiated may be immediately after the engine start is initiated or after the engine start is completed.

Each of the controller 120, the engine control unit 121, the motor control unit 123, the converter control unit 125, and the integrated value calculating unit 127 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the controller 120, the engine control unit 121, the motor control unit 123, the converter control unit 125, and the integrated value calculating unit 127 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the non-volatile memory may include a ROM and an NVRAM. The ASIC is an integrated circuit (IC) customized to perform, and the FPGA is an integrated circuit designed to be configured after manufacturing in order to perform, all or a part of the functions of each of the controller 120, the engine control unit 121, the motor control unit 123, the converter control unit 125, and the integrated value calculating unit 127 illustrated in FIG. 2.

The invention claimed is:

1. A control device for a hybrid vehicle using an engine and a driving motor, the hybrid vehicle including a starter motor configured to start the engine, a direct-current-to-direct-current converter, and a battery coupled to the starter motor via the direct-current-to-direct-current, the control device comprising:
a controller configured to:
switch a traveling mode between a first traveling mode in which the vehicle travels by use of the engine being driven and a second traveling mode in which the vehicle travels by use of the driving motor with the engine being stopped;
limit an output voltage of the direct-current-to-direct-current converter when the controller detects that an output current of the direct-current-to-direct-current converter becomes equal to or higher than a first threshold;
switch the first threshold to a second threshold higher than the first threshold when driving the starter motor to start the engine in case of switching from the second traveling mode to the first traveling mode, and use the second threshold until the engine rotation speed reaches a reference rotation speed; and
prohibit, for a time, switching to the second threshold after the engine rotation speed reaches a reference rotation speed.

2. The control device according to claim 1, wherein the controller is configured to stop a boost permitting control after initiating of an engine start.

3. The control device according to claim 2, wherein the controller is configured to stop the boost permitting control when an engine rotation speed reaches a reference rotation speed after the initiating of the engine start.

4. The control device according to claim 2, wherein the controller is configured to initiate the boost permitting control when a reference time passes after the boost permitting control is executed in association of the initiating of the engine start and is thereafter stopped, the reference time being determined on a basis of an integrated value of an output of the direct-current-to-direct-current converter in a period in which the boost permitting control is being executed.

5. The control device according to claim 3, wherein the controller is configured to initiate the boost permitting control when a reference time passes after the boost permitting control is executed in association of the initiating of the engine start and is thereafter stopped, the reference time being determined on a basis of an integrated value of an output of the direct-current-to-direct-current converter in a period in which the boost permitting control is being executed.

6. The control device according to claim 2, wherein the controller is configured to initiate the boost permitting control in a case where a temperature of the direct-current-to-direct-current converter becomes lower than a reference temperature after the boost permitting control is executed in association with the initiating of the engine start and is thereafter stopped.

7. The control device according to claim 3, wherein the controller is configured to initiate the boost permitting control in a case where a temperature of the direct-current-to-direct-current converter becomes lower than a reference temperature after the boost permitting control is executed in association with the initiating of the engine start and is thereafter stopped.

8. The control device according to claim 4, wherein the controller is configured to initiate the boost permitting control in a case where a temperature of the direct-current-to-direct-current converter becomes lower than a reference temperature after the boost permitting control is executed in association with the initiating of the engine start and is thereafter stopped.

9. The control device according to claim 5, wherein the controller is configured to initiate the boost permitting control in a case where a temperature of the direct-current-to-direct-current converter becomes lower than a reference temperature after the boost permitting control is executed in association with the initiating of the engine start and is thereafter stopped.

10. The control device according to claim 2, wherein the controller is configured to prohibit switching from the first traveling mode to the second traveling mode while the boost permitting control is being stopped after the boost permitting control is executed in association with the initiating of the engine start.

11. The control device according to claim 3, wherein the controller is configured to prohibit switching from the first traveling mode to the second traveling mode while the boost permitting control is being stopped after the boost permitting control is executed in association with the initiating of the engine start.

12. The control device according to claim 4, wherein the controller is configured to prohibit switching from the first traveling mode to the second traveling mode while the boost permitting control is being stopped after the boost permitting control is executed in association with the initiating of the engine start.

13. The control device according to claim 5, wherein the controller is configured to prohibit switching from the first traveling mode to the second traveling mode while the boost permitting control is being stopped after the boost permitting control is executed in association with the initiating of the engine start.

14. A control device for a hybrid vehicle using an engine and a driving motor, the hybrid vehicle including a starter motor configured to start the engine, a direct-current-to-direct-current converter, and a battery coupled to the starter motor via the direct-current-to-direct-current, the control device, comprising:
    circuitry configured to:
        switch a traveling, mode between a first traveling mode in which the vehicle travels by use of the engine being driven and a second traveling mode in which the vehicle travels by use of the driving motor with the engine being stopped;
        limit an output voltage of the direct-current-to-direct-current converter when the controller detects that an output current of the direct-current-to-direct-current converter becomes equal to or higher than a first threshold,
        switch the first threshold to a second threshold higher than the first threshold when driving the starter motor to start the engine in case of switching from the second traveling mode to the first traveling mode, and use the second threshold until the engine rotation speed reaches a reference rotation speed; and
        prohibit, for a time, switching to the second threshold after the engine rotation speed reaches a reference rotation speed.

15. The control device according to claim 1, wherein the controller includes an integrated value calculating unit that is configured to calculate an integrated value of an output of the direct-current-to-direct-current converter by calculating, as the integrated value of the output of the direct-current-to-direct-current converter, a root mean square value of the output current of the direct-current-to-direct-current converter, and
    wherein the integrated value calculating unit determines a reference time on a basis of the integrated value of the output of the direct-current-to-direct-current converter.

16. The control device according to claim 1, further comprising an accessory coupled to the battery which consumes the electric power of the battery,
    wherein, if the accessory is in operation and consuming the electric power of the battery when the engine start is initiated and the output of the direct-current-to-direct-current converter falls short of the electric power to be consumed by the starter motor and the accessory, the boost permitting control is initiated by the controller.

* * * * *